United States Patent
Nishio

(10) Patent No.: US 7,909,702 B2
(45) Date of Patent: Mar. 22, 2011

(54) SHAFT MOUNTING STRUCTURE OF CONSTANT VELOCITY JOINT

(75) Inventor: Keisuke Nishio, Shizuoka-ken (JP)

(73) Assignee: NTN Corporation, Osaka (JP)

( * ) Notice: Subject to any disclaimer, the term of this patent is extended or adjusted under 35 U.S.C. 154(b) by 516 days.

(21) Appl. No.: 11/987,873

(22) Filed: Dec. 5, 2007

(65) Prior Publication Data
US 2008/0161119 A1    Jul. 3, 2008

(30) Foreign Application Priority Data

Dec. 27, 2006  (JP) ................... 2006-352943

(51) Int. Cl.
*F16D 1/06*     (2006.01)
(52) U.S. Cl. ............... 464/182; 464/906; 403/359.5
(58) Field of Classification Search ............... 464/111, 464/140–146, 182, 904–906; 403/359.5, 403/359.6
See application file for complete search history.

(56) References Cited

U.S. PATENT DOCUMENTS

| 2,844,013 | A | * | 7/1958 | Spence | 403/359.5 X |
| 4,756,640 | A | * | 7/1988 | Gehrke | 403/359.5 X |
| 5,529,538 | A | * | 6/1996 | Schulz et al. | 464/111 |
| 2005/0124423 | A1 | | 6/2005 | Kuczera et al. | |

FOREIGN PATENT DOCUMENTS

JP   2006-218983   8/2006

* cited by examiner

*Primary Examiner* — Greg Binda
(74) *Attorney, Agent, or Firm* — Wenderoth, Lind & Ponack, L.L.P.

(57) ABSTRACT

A shaft mounting structure of a constant velocity joint is capable of ensuring sufficient strength of a fitting portion between an inner ring and a shaft. In the shaft mounting structure, a groove is formed on the shaft middle side compared to the position of a male spline of a shaft and the outside diameter of a bottom portion of the groove is set at a value larger than the root diameter of the male spline.

1 Claim, 4 Drawing Sheets

SHAFT MOUNTING STRUCTURE OF CONSTANT VELOCITY JOINT

TECHNICAL FIELD

The present invention relates to a shaft mounting structure of a constant velocity joint used in a constant velocity joint that performs the transmission of torques at a constant velocity between rotating shafts present on not straight lines used in automobiles and various kinds of industrial equipment.

BACKGROUND OF THE INVENTION

In a constant velocity joint built in a driving system of an automobile, a shaft insertion hole is provided in an inner ring, and an axially extending male spline that is formed on an outer circumference of an end portion of a shaft and an axially extending female spline that is formed on an inner circumference of the insertion hole are caused to fit onto each other. And a retaining ring as a retaining member is used to restrict the axial movement of the shaft with respect to the inner ring.

For a concrete construction of a shaft mounting structure of a constant velocity joint, for example, as shown in FIG. 4, a shaft 101 is inserted into an inner ring 100, and a retaining ring 102 is attached to a leading end of the shaft 101 that protrudes from the inner ring 100. And the retaining ring 102 is caused to interfere at the back of the side opposite to the shaft insertion side of the inner ring 100, whereby the axial movement of the shaft 101 is restricted (refer to Japanese Patent Laid-Open No. 2006-218983). Also as shown in FIG. 5, there is a case where a retaining ring 102 and an inner ring 100 are caused to interfere with each other at the front of the shaft insertion side (refer to US 2005/0124423A1).

Incidentally, particularly, in the case of a closed type in which an end of an outer ring of a constant velocity joint is closed and the construction is such that a retaining ring interferes with an inner ring on the back side as shown in FIG. 4, it is impossible to attach the retaining ring, with the inner ring and the outer ring combined with each other. Furthermore, in this case, after the combining of the inner ring and the outer ring, it is impossible to visually recognize the attachment state of the retaining ring and the like from the outside and hence it is difficult to check quality. On the other hand, in a structure in which the retaining ring and the inner ring interfere with each other on the front side as shown in FIG. 5, this defect does not exist and the structure of FIG. 5 is desirable in terms of the ease of assembling work and the visibility of the assembled state.

In a conventional example as shown in FIG. 5, however, a groove 103 to which the retaining ring 102 is attached is formed in a male spline 101a of the shaft 101. Therefore, stress concentration occurs in the place of this groove 103, posing the problem of low strength.

SUMMARY OF THE INVENTION

Therefore, in view of such circumstances as described above, the present invention provides a shaft mounting structure of a constant velocity joint capable of ensuring sufficient strength of a fitting portion between an inner ring and a shaft.

The first feature of the present invention resides in a shaft mounting structure of a constant velocity joint in which an axially extending male spline that is formed on an outer circumference of an end portion of a shaft is caused to fit into an axially extending female spline that is formed on an inner circumference of an inner joint member of the constant velocity joint and the axial movement of the shaft is restricted by attaching a retaining member interfering with the inner joint member to a groove formed on an outer circumference of the shaft, in which the groove is formed on the shaft middle side compared to the position of the male spline of the shaft and the outside diameter of a bottom portion of the groove is set at a value larger than the root diameter of the male spline.

By forming the groove on the shaft middle side of the male spline, it is possible to prevent stress concentration from occurring in the male spline. Because the outside diameter of a bottom portion of the groove is set at a value larger than the root diameter of the male spline, strength large enough to withstand stress concentration is ensured even when the stress concentration occurs in the groove. Furthermore, the construction is such that the retaining member is attached on the shaft middle side, i.e., the shaft insertion side, and therefore, even when the inner ring is assembled to the outer ring of a closed type, in particular, retaining can be accomplished with the retaining member by inserting the shaft into the inner ring. Thus, the ease of assembling work is excellent and it is possible to ensure the visibility of the assembled state.

The second feature of the present invention resides in that a large diameter portion having a diameter larger than the crest diameter of the male spline is formed on the shaft middle side compared to the position of the male spline of the shaft, that the groove is formed in the large diameter portion, and that the outside diameter of the bottom portion of the groove is set at a value larger than the root diameter of the male spline.

It is possible to prevent stress concentration form occurring in the male spline. By forming the groove in the large diameter portion, it is possible to ensure a sufficient groove depth and strength that is large enough to withstand stress concentration even when the stress concentration occurs in the groove. Furthermore, the construction is such that the retaining member is attached on the shaft middle side, i.e., the shaft insertion side, and therefore, even when the inner ring is assembled to the outer ring of a closed type, in particular, retaining can be accomplished with the retaining member by inserting the shaft into the inner ring. Thus, the ease of assembling work is excellent and it is possible to ensure the visibility of the assembled state.

The third feature of the present invention resides in that on an inner circumference of the inner joint member on the shaft insertion side is formed an enlarged inside diameter portion into which the large diameter portion of the shaft can be inserted, and that in the enlarged inside diameter portion is formed a concavity capable of engaging with the retaining member attached to the groove of the shaft.

Even when an axial force acts on the shaft, the axial movement of the shaft is restricted by the engagement of the retaining member with the concavity.

According to the shaft mounting structure of a constant velocity joint of the present invention, it is possible to prevent stress concentration form occurring in the male spline of the shaft because no groove is formed in the male spline. And because the outside diameter of the bottom portion of the groove, which is formed on the shaft middle side compared to the position of the male spline of the shaft, is set at a value larger than the root diameter of the male spline, the groove can have strength that is large enough to withstand stress concentration.

DETAILED DESCRIPTION OF THE PREFERRED EMBODIMENTS

An embodiment of the present invention will be described with reference to the accompanying drawings.

Figure 1:
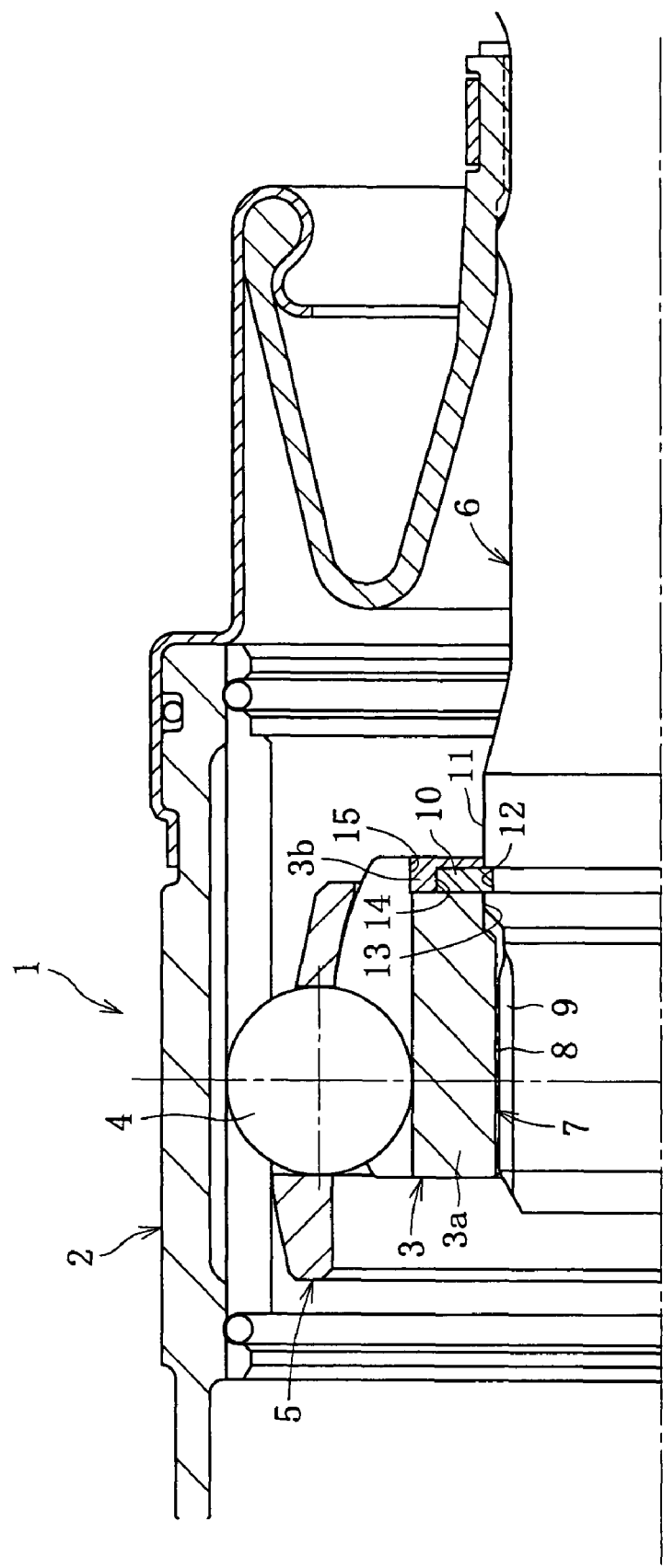
FIG. 1 is a sectional view showing an embodiment of a shaft mounting structure of a constant velocity joint related to the present invention.
Figure 2:
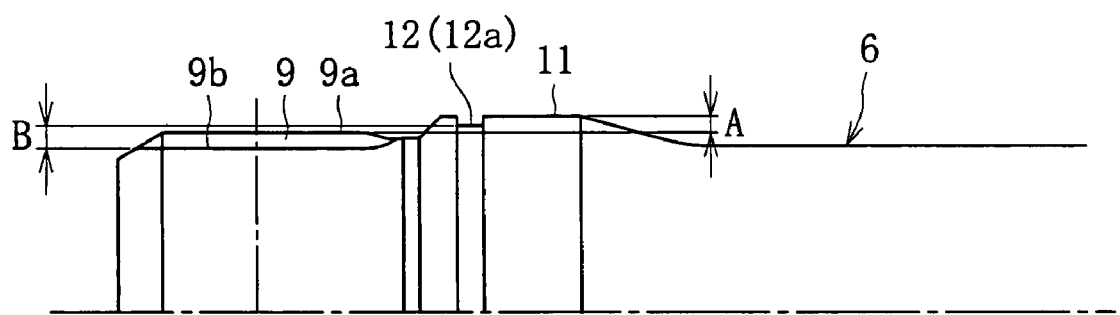
FIG. 2 is a side view of a shaft.
Figure 3:
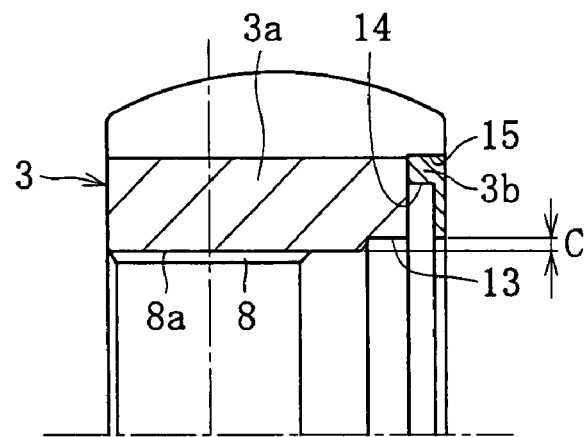
FIG. 3 is a sectional view of an inner ring.
Figure 4:
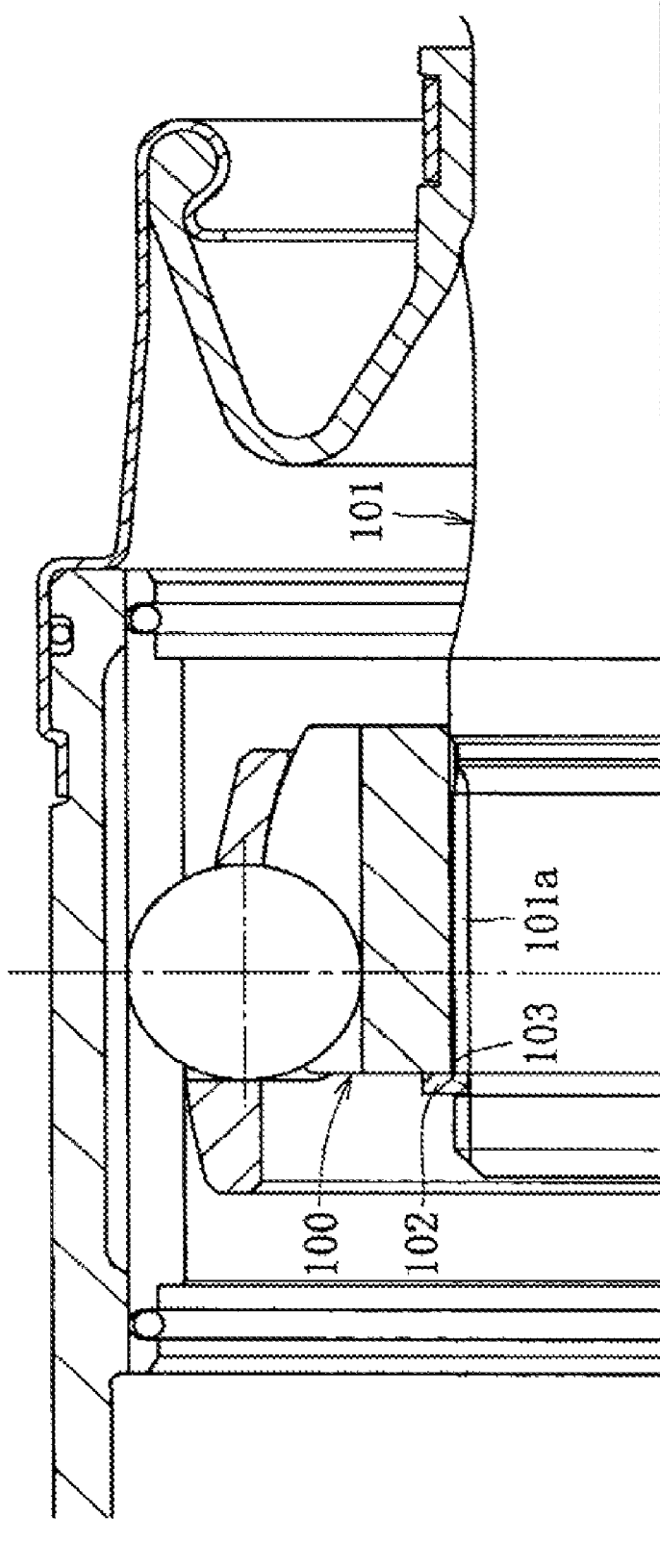
FIG. 4 is a sectional view showing a conventional shaft mounting structure of a constant velocity joint.
Figure 5:
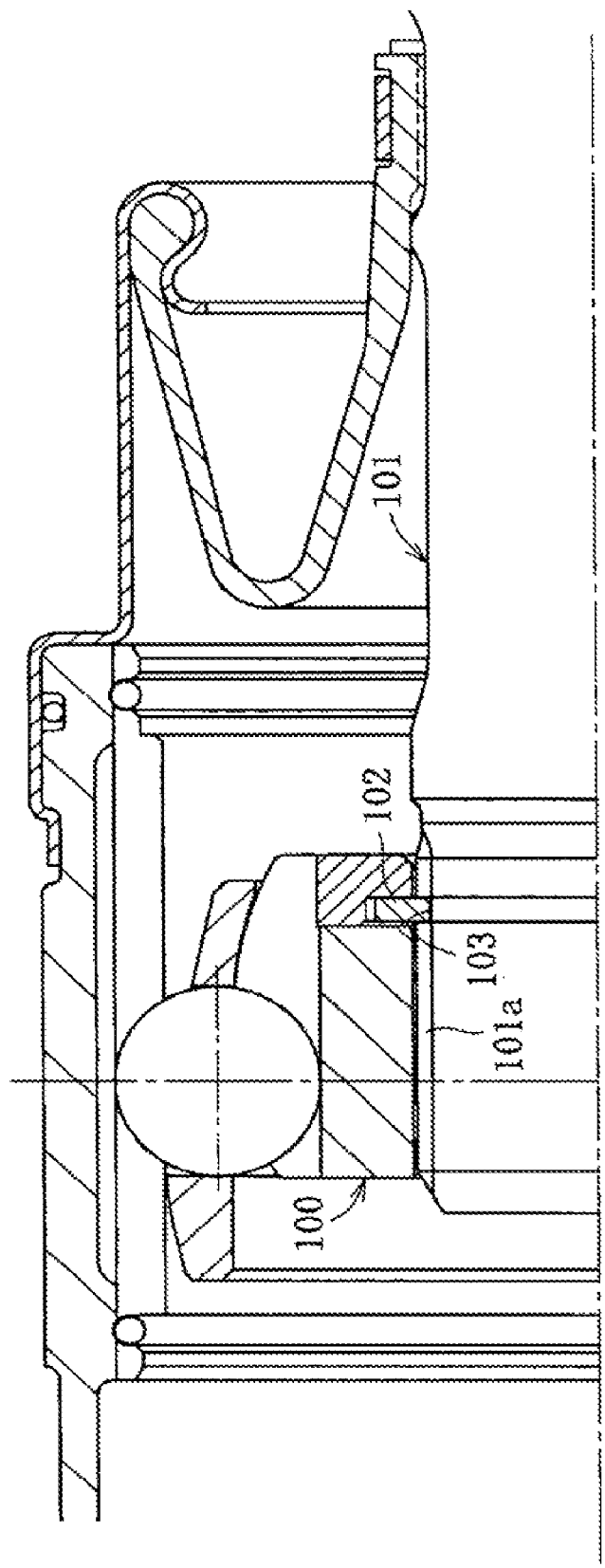
FIG. 5 is a sectional view showing another conventional shaft mounting structure of a constant velocity joint.

FIG. 1 is a sectional view showing an embodiment of a shaft mounting structure of a constant velocity joint related to the present invention, FIG. 2 is a side view of a shaft, and FIG. 3 is a sectional view of an inner ring of the constant velocity joint. In FIG. 1, the constant velocity joint 1 has, as its principal components, an outer ring 2 as an outer joint member, an inner ring 3 as an inner joint member, a plurality of torque transmission balls 4 interposed between the outer ring 2 and the inner ring 3 so as to be able to roll, and a cage 5 that retains the torque transmission balls 4.

In the inner ring 3 is formed an insertion hole 7 to fit onto a shaft 6. An axially extending female spline 8 is formed on an inner circumferential surface of this insertion hole 7, and by causing an axially extending male spline 9, which is formed on an external circumference of an end portion of the shaft 6, to fit onto this female spline 8, the inner ring 3 and the shaft 6 are connected so as to be able to transmit torques.

In order to restrict the axial movement of the shaft 6 with respect to the inner ring 3, on an outer circumference of the shaft 6 is provided a retaining ring 10 as a retaining member interfering with the inner ring 3. Concretely, a large diameter portion 11 is formed on the shaft middle side (the right side in FIG. 1) compared to the position of the male spline 9 of the shaft 6, and on an outer circumference of this large diameter portion 11 is formed an annular groove 12 to which the retaining ring 10 is to be attached.

As indicated by a radial dimensional difference A in FIG. 2, the large diameter portion 11 is formed with a diameter larger than a crest diameter 9a of the male spline 9. As indicated by a radial dimensional difference B in the figure, the outside diameter of a bottom portion 12a (a small diameter portion) of the groove 12 is set at a value larger than the root diameter 9b of the male spline 9.

As shown in FIG. 1, on an inner circumference of the inner ring 3 on the shaft insertion side (the right side in FIG. 1) is formed an enlarged inside diameter portion 13 into which the large diameter portion 11 of the shaft 6 can be inserted. On an inner circumference of this enlarged inside diameter portion 13 is formed an annular concavity 14, and this concavity 14 and the retaining ring 10 attached to the groove 12 of the shaft 6 engage with each other.

The inner ring 3 will be described in detail. As shown in FIG. 3, the inner ring 3 has a main body portion 3a having the female spline 8 on the inner circumference thereof and a sectionally L-shaped fitting portion 3b having the bottom portion (the large diameter portion) of the concavity 14. On the shaft insertion side of the main body portion 3a is formed a fitting hole portion 15 into which the fitting portion 3b is fitted, and the fitting portion 3b can be attached and detached to and from the main body portion 3a. The enlarged inside diameter portion 13 formed in a region from the main body portion 3a to the fitting portion 3b is formed to have a size larger than the root diameter 8a of the female spline 8 as indicated by a diametrical dimensional difference C.

Next, a method of mounting the shaft 6 to the inner ring 3 will be described. At the beginning, the fitting portion 3b of the inner ring 3 is in a condition separated from the main body portion 3a. First, the fitting portion 3b and the retaining ring 10 are externally fitted onto the leading end of the shaft 6 in this order, and the retaining ring 10 is attached to the groove 12 of the shaft 6. In this state, the shaft 6 is inserted into the insertion hole 7 of the inner ring 3 and the female spline 8 and the male spline 9 are fitted onto each other. The retaining ring 10 is in the fitting hole portion 15 of the inner ring 3, and the fitting portion 3b is press fitted into this fitting hole portion 15 and assembled. The retaining ring 10 comes to a condition in which the retaining ring 10 is housed in the concavity 14 formed between the main body portion 3a and the fitting portion 3a of the inner ring 3. The mounting of the shaft 6 to the inner ring 3 is completed in this manner.

Even when an axial extraction force works on the shaft 6 in this state of completed mounting, the axial movement of the shaft 6 in the extraction direction is prevented due to the interference between the inner ring 3 and the retaining ring 10, because the retaining ring 10 attached to the groove 12 of the shaft 6 is engaged with the concavity 14 of the inner ring 3. Even when the inner ring 3 is beforehand assembled to the outer ring 2, mounting can be performed by following the above-described procedure.

The present invention is not limited to the above-described embodiment. It is needless to say that various changes can be made to the embodiment so long as they do not depart form the scope of the invention.

For example, although the sectional shape of the retaining ring 10 and the sectional shape of the groove 12 and concavity 14 are rectangular in the embodiment, the sectional shape of these may be circular or polygonal. Although the main body portion 3a and fitting portion 3b of the inner ring 3 are exemplified by two separate parts to be combined in the embodiment, the two as an integral part may have the concavity 14.

What is claimed is:

1. A shaft mounting structure of a constant velocity joint, the shaft mounting structure comprising:

an inner joint member having an inner circumference with an axially extending female spline formed on the inner circumference;

a shaft having an outer circumference with a groove formed thereon and an end portion with an axially extending male spline formed on an outer circumference of the end portion, the male spline fitting into the female spline; and a retaining member for attaching to the groove of the shaft, the retaining member restricting an axial movement of the shaft by interfering with the inner joint member, wherein the groove is formed on a shaft middle side of the shaft compared to a position of the male spline and an outside diameter of a bottom portion of the groove is set at a value larger than a root diameter of the male spline, the shaft has a large diameter portion having a diameter larger than a crest diameter of the male spline formed on the shaft middle side, the groove being formed in the large diameter portion, and a shaft insertion side of the inner circumference of the inner joint member has formed an enlarged inside diameter portion into which the large diameter portion of the shaft is insertable, the enlarged inside diameter portion having a concavity formed therein that is capable of engaging with the retaining member attached to the groove of the shaft.

* * * * *